(12) United States Patent
Cuvillier et al.

(10) Patent No.: US 11,440,470 B2
(45) Date of Patent: Sep. 13, 2022

(54) TRIM ELEMENT COMPRISING A BACKLIT AREA

(71) Applicant: FAURECIA INTERIEUR INDUSTRIE, Nanterre (FR)

(72) Inventors: Christophe Cuvillier, Saint ouen L'Aumône (FR); Armand Brousselle, Paris (FR)

(73) Assignee: FAURECIA INTERIEUR INDUSTRIE, Nanterre (FR)

( * ) Notice: Subject to any disclaimer, the term of this patent is extended or adjusted under 35 U.S.C. 154(b) by 0 days.

(21) Appl. No.: 17/307,994

(22) Filed: May 4, 2021

(65) Prior Publication Data
US 2021/0347297 A1    Nov. 11, 2021

(51) Int. Cl.
*B60Q 3/54* (2017.01)
*B60Q 3/62* (2017.01)
*B60Q 3/82* (2017.01)
*B60R 13/02* (2006.01)
*F21V 8/00* (2006.01)

(52) U.S. Cl.
CPC ......... *B60Q 3/54* (2017.02); *B60Q 3/62* (2017.02); *B60Q 3/82* (2017.02); *B60R 13/02* (2013.01); *G02B 6/0045* (2013.01); *G02B 6/0055* (2013.01); *B60R 2013/0287* (2013.01)

(58) Field of Classification Search
CPC ....... B60Q 3/54; B60R 13/02; B60R 13/0205; B60R 13/0211; B60R 13/0217; B60R 13/0223; B60R 13/0229; B60R 13/0235; B60R 13/0241; B60R 13/0247; B60R 13/0252; B60R 13/0258; B60R 13/0264; B60R 13/027; B60R 13/0276; B60R 13/0282; B60R 13/0288; B60R 13/0294
See application file for complete search history.

(56) References Cited

U.S. PATENT DOCUMENTS 10,279,736 B2 * 5/2019 Schneider ............. F21V 7/0091
10,513,222 B2 * 12/2019 Betz .................... G02B 6/0065

FOREIGN PATENT DOCUMENTS

| DE | 102016005619 A1 | 11/2017 |
| DE | 102018207071 A1 | 11/2019 |
| WO | 2020193135 A1 | 10/2020 |

OTHER PUBLICATIONS

French Search Report corresponding to French Application No. FR 2004421, dated Jan. 13, 2021, 2 pages.

* cited by examiner

*Primary Examiner* — Robert J May
(74) *Attorney, Agent, or Firm* — Reising Ethington P.C.

(57) ABSTRACT

A trim element having a covering layer containing at least one opaque area preventing the passage of light and at least one backlit area translucent so as to enable the passage of light, the trim element further including at least one light source and at least one reflective surface extending opposite the light source and being arranged to reflect the light emitted by the light source toward the backlit area. The light source is attached to the covering layer opposite the opaque area, and the reflective surface extends opposite the covering layer to reflect light emitted by the light source toward the backlit area.

10 Claims, 2 Drawing Sheets

TRIM ELEMENT COMPRISING A BACKLIT AREA

TECHNICAL FIELD

The present invention relates to a vehicle trim element of the type comprising a covering layer defining an outer surface, forming the outer surface of the trim element, and an inner surface, opposite the outer surface, the covering layer comprising at least one opaque area preventing the passage of light from the inner surface to the outer surface and at least one backlit area in which said covering layer is translucent so as to allow light to pass from the inner surface to the outer surface, the backlit area extending around at least part of the opaque area, the trim element further comprising at least one light source and at least one reflective surface extending opposite the light source and being arranged to reflect the light emitted by the light source toward the backlit area.

BACKGROUND

It is known of providing backlit areas on the outer surface of a trim element in order to illuminate patterns, such as pictograms or decorative patterns or in order to indicate the presence of functional elements, such as control buttons or the like.

For this purpose, the covering layer comprises translucent areas having the shape of the patterns to be displayed and light sources are arranged opposite these translucent areas on the inner side of the covering layer in order to illuminate them.

However, in order to ensure a good homogenization of the light when it reaches the outer surface of the trim element, it is necessary to provide a certain distance between the light sources and the backlit areas, which increases the thickness of the trim element and its bulkiness.

SUMMARY

The invention aims to overcome this drawback by proposing a trim element whose arrangement of the light source and the reflecting element is optimized so as to reduce the space requirement.

To this end, the invention relates to a trim element of the aforementioned type in which the light source is attached to the inner surface of the covering layer opposite the opaque area, the reflective surface extending opposite the inner surface of the covering layer and being oriented with respect to said inner surface to reflect the light emitted by the light source toward the backlit area.

Providing such an arrangement of the light source within the trim element ensures that the light is homogenized correctly when it reaches the backlit area while significantly reducing the thickness of the trim element.

In fact, the light travels back and forth between the covering layer and the reflective surface, which makes it possible to reduce the thickness of the trim element while maintaining a sufficient distance covered by the light to enable it to homogenize well.

Various embodiments of the invention may include on or more of the following optional features of the trim element, considered alone or according to all technically possible combinations:

- the trim element further comprises a support, the covering layer extending at least partially over the support, the reflective surface comprising a plurality of reflecting surfaces inclined with respect to each other and extending between the support and the covering layer and guiding the light emitted by the light source toward the backlit area;
- the light is emitted from the light source toward the reflective surface in at least a first direction away from the covering layer and is reflected from the reflective surface toward the backlit area in at least a second direction extending toward the covering layer;
- the trim element further comprises a light guide comprising:
  - an outer face extending over at least part of the inner surface of the covering layer opposite the backlit area and covering the light source, and
  - an inner face extending over at least part of the reflective surface,
  - the light guide being arranged to diffuse the light emitted by the light source toward the reflective surface and from the reflective surface toward the backlit area;
- the light guide is over-molded onto the inner surface of the covering layer and onto each light source;
- the reflective surface is defined by a reflecting layer extending at least partially over the inner face of the light guide;
- at least one backlit area extends entirely around the opaque area,
  - the reflective surface having an axis of symmetry passing through the light source and extending substantially perpendicular to the outer surface of the trim element,
  - the reflective surface reflecting the light emitted by said light source toward said backlit area, said light being distributed over the entire backlit area;
- the trim element further comprises a printed circuit on the inner surface of the covering layer, the printed circuit electrically connecting each light source to an electric power source;
- the trim element further comprises a switch and a touch film,
  - the switch electrically connecting the light source and the electric power source and being movable between a closed position in which the electric power source powers the light source and an open position in which the electric power source does not power the light source,
  - the touch film extending over the inner surface of the covering layer opposite the opaque area and being configured to flip the switch between its closed position and its open position when pressure is applied to said touch film;
- the trim element further comprises a functional element extending over the outer surface of the covering layer opposite the opaque area.

BRIEF DESCRIPTION OF THE DRAWINGS

Further aspects and advantages of the invention will become apparent from the following description, given by way of example and made with reference to the appended drawings, in which.

DETAILED DESCRIPTION

Figure 1:
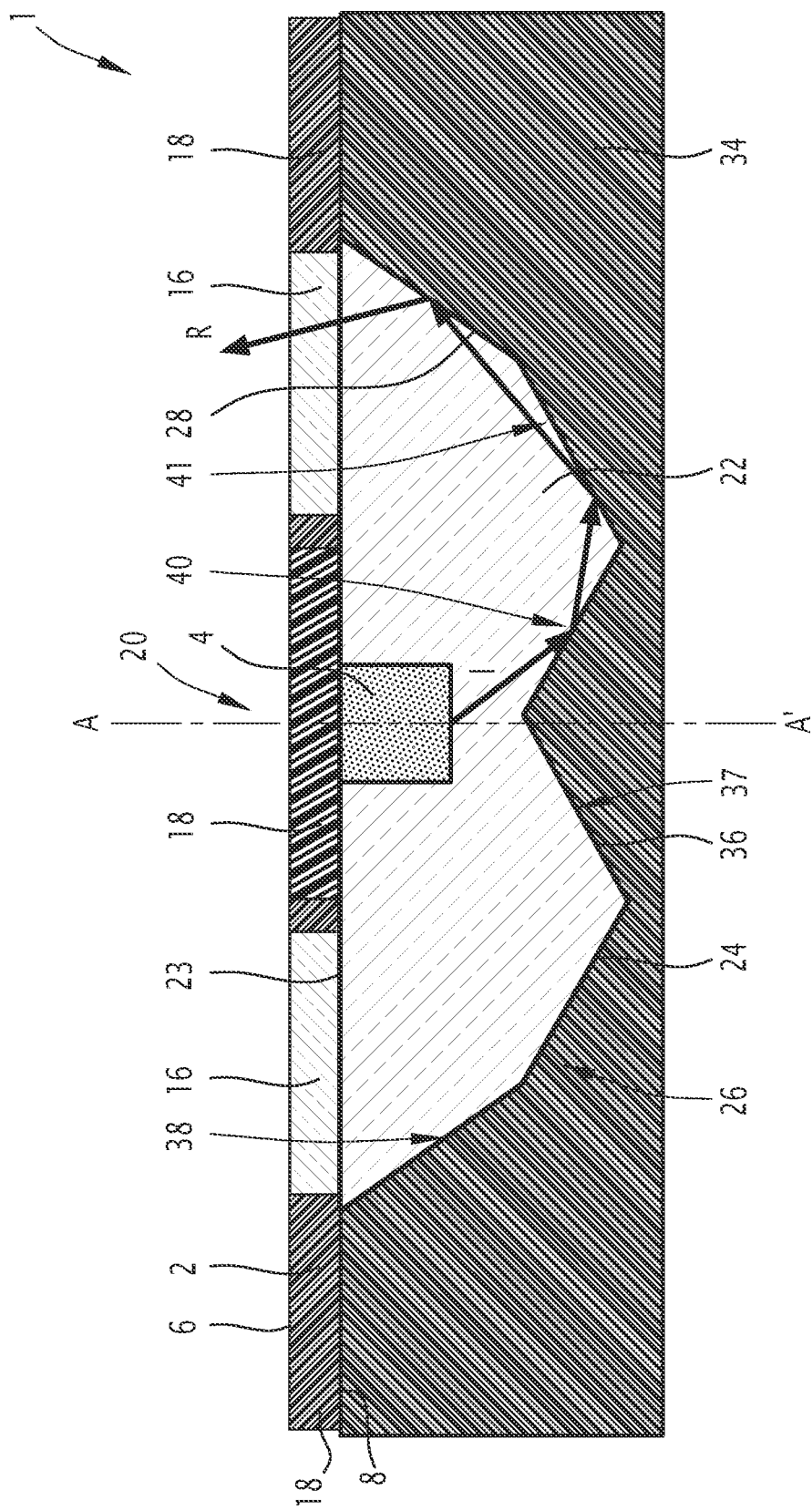
FIG. 1 is a schematic cross-sectional representation of part of a trim element according to one embodiment of the invention.
Figure 2:
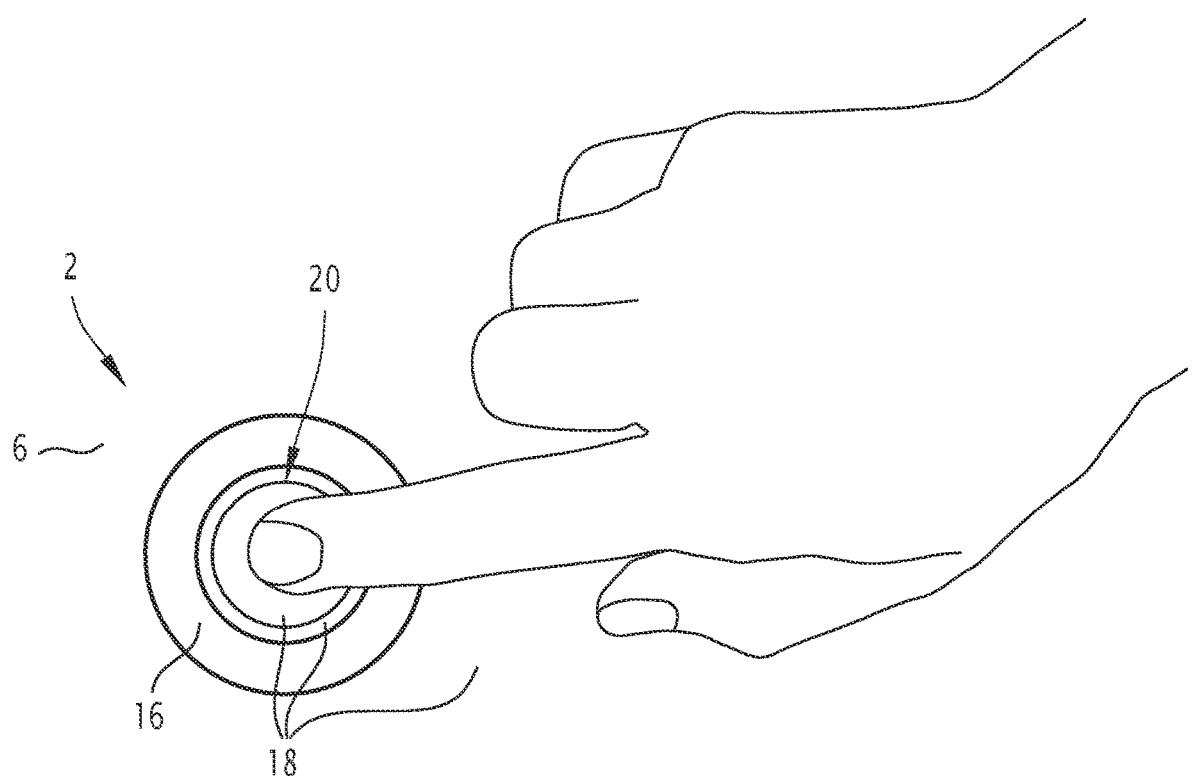
FIG. 2 is a schematic representation viewed from above of a trim element according to another embodiment of the invention.

With reference to FIGS. 1 and 2, a vehicle trim element 1 comprising a covering layer 2 and at least one light source 4 is described. For example, such a trim element 1 forms all or part of a door panel, a center console, a vehicle dashboard or the like.

The covering layer 2 comprises an outer surface 6, forming at least part of the visible surface of the trim element 1, and an inner surface 8, opposite the outer surface 6 and extending on the inner side of the trim element 1. Thus, the outer surface 6 forms the outer surface of the trim element 1 and gives its appearance to at least part of the trim element 1, for example, while the inner surface 8 is intended to be turned toward the part of the vehicle on which the trim element 1 is intended to be installed. The covering layer 2 may comprise several layers. For example, the covering layer 2 comprises at least one functional layer defining the inner surface 8 of the covering layer 2. For example, the covering layer 2 further comprises at least one appearance layer defining the outer surface 6 of the covering layer. The covering layer 2 includes at least the functional layer, the appearance layer being optional.

In a variant, for example, the covering layer 2 comprises a transparent layer, defining the outer surface 6, the appearance layer then being covered at least partially by the transparent layer. The transparent layer is treated with an anti-scratch, anti-fouling, anti-reflection or other treatment, for example.

The functional layer is, for example, formed by a plastic material such as, for example, polycarbonate (PC), polyethylene terephthalate (PET), polymethyl methacrylate (PMMA) or even a mixture of PC and PMMA. It has a thickness of between 175 µm and 2 mm, for example.

For example, the appearance layer is substantially continuous and covers all or part of the trim element 1. The appearance layer is for example formed by a skin that can be formed of any suitable material, such as a plastic material, a wooden material or the like. In a variant, the appearance layer may be a simple varnish layer applied onto the functional layer.

Opposite the outer surface 6, the appearance layer comprises a reverse surface on which the functional layer extends.

The covering layer 2 comprises at least one backlit area 16 and at least one opaque area 18.

The backlit area 16 is transparent or translucent, so as to allow light emitted by the light source 4 to pass through the covering layer 2 from the inner surface 8 to the outer surface 6 of the covering layer 2 so as to be visible from outside of the trim element 1. Translucent is understood as a light transmission rate of between 5% and 100%, with 100% corresponding to a transparent layer. The translucency of the backlit area 16 may be given to it either by the material forming the backlit area 16 or by its thickness.

The backlit area 16 can have any desired shape depending on what is desired to be displayed on the outer surface 6 of the covering layer 2. For example, a backlit area 16 has the shape of a pictogram or pattern to be displayed. The shape of the backlit areas 16 may differ from one backlit area 16 to another. The covering layer 2 may include multiple backlit areas 16, for example, more than two backlit areas 16, depending on what is desired to be displayed on the outer surface 6 of the covering layer 2.

The backlit area 16 extends, around at least part of the opaque area 18, for example.

According to the embodiment illustrated in FIGS. 1 and 2, the backlit area 16 extends entirely around the opaque area 18 so as to surround the opaque area 18.

According to this embodiment, the backlit area 16 surrounds a functional area comprising a functional element 20. The functional element 20 extends over the outer surface 6 of the covering layer 2 opposite the opaque area 18.

For example, the functional element 20 is a controller configured to control a switch (not shown) of the trim element 1.

According to one embodiment, the light source 4 is attached to an electrical connection circuit (not shown) made on the inner surface 8 of the covering layer 2 facing an opaque area 18. For example, the tracks of such an electrical connection circuit are printed on the inner surface 8 of the covering layer 2 and the light source 4 is electrically connected to this electrical connection circuit. For example, the electrical connection circuit is powered by an electrical power source being, for example, the power supply of the vehicle in which the trim element 1 is installed. Tracks enabling the connection of the electrical connection circuit to this power supply, the switch and the switch controller are then also provided on the inner surface 8 of the covering layer 2. The electrical connection circuit is formed, for example, by a conductive ink layer, silver-based for example.

The covering layer 2 further comprises at least one decorative ink layer, for example printed on an inner or outer surface of the functional layer, for example.

The switch is configured to electrically connect the light source 4 with the electrical power source and is movable between a closed position in which the switch enables the electrical power source to supply the light source 4 and an open position in which the switch prevents the electrical power source from supplying the light source 4. In particular, in the closed position, the electrical power source powers the light source 4 and the light source 4 emits light and in the open position the electrical power source does not power the light source 4 and the light source 4 does not emit light.

The switch controller is configured to toggle the switch between its closed position and its open position.

For example, the switch controller is a touch film extending on the inner surface 8 of the covering layer 2 opposite the opaque area 18 and being configured to toggle the switch between its closed position and its open position when pressure is applied to said touch film. According to a variant, the conductive ink layer is printed on the touch film.

According to a variant of this embodiment, the switch controller is a push button extending on the outer surface 6 of the covering layer 2, for example, and accessible to a passenger of the vehicle.

The functional element 20 is, for example, a button for controlling an element of the vehicle in which the trim element 1 is installed. For example, the functional element 20 is a button for controlling the vehicle's hazard lights, movable between a nominal position in which the hazard lights are off and a hazard position in which the hazard lights are on. The backlit area 16 can, for example, indicate the presence of the functional element 20 so that the functional element 20 is visible to a passenger of the vehicle. The backlit area 16 can also be used, for example, to indicate the status of the functional element 20. For example, the backlit area 16 may be capable of indicating whether the vehicle's hazard light control button is in its nominal position or in its hazard position depending on whether light emitted from the light source 4 passes through the backlit area 16.

According to one variant, for example, the functional element 20 may also be a surface presenting information in the form of an icon, for example. The functional element 20 is, for example, a dashboard indicator of the vehicle in which the trim element 1 is installed. The dashboard indicator is configured to indicate a failure of a vehicle component, for example. The backlit area 16 allows, for example, to indicate whether said vehicle component has a failure or not depending on whether light emitted from the light source 4 passes through the backlit area 16 or not.

When the functional element 20 allows to control a vehicle component such as the vehicle's hazard lights, for example, the electrical connection circuitry allows to connect the switch to the functional element 20. For example, the switch is configured to switch to its closed position when the hazard warning light control button is in the hazard position and is configured to switch to its open position when the hazard warning light control button is in its nominal position.

In a variant, the electrical connection circuit enables the switch to be connected to a sensor configured to generate information about the status of a vehicle component. For example, the sensor is configured to generate ignition information when the hazard lights are on. The switch is then configured to switch to its closed position when an ignition information is generated by the sensor and, if not, is configured to switch to its open position.

According to still another variant, when the functional element 20 is a vehicle dashboard indicator configured to indicate a failure of a vehicle component, for example, the electrical connection circuit enables the switch to be connected to a sensor configured to generate information on the presence of a failure when said component has a failure. For example, the switch is configured to switch to its closed position when failure presence information is generated by the sensor and is configured to switch to its open position otherwise.

According to the embodiment illustrated in FIGS. 1 and 2, the covering layer 2 comprises a backlit area 16 extending entirely around the opaque area 18 symmetrically with respect to the opaque area 18. In particular, the backlit area 16 is ring-shaped, having the opaque area 18 as its center. Thus, the backlit area 16 makes it possible to delimit and locate the functional element 20 with precision so that it can be easily detected by a vehicle passenger, in particular when light emitted by the light source 4 passes through the backlit area 16.

The opaque area 18 is arranged to prevent the passage of light from the inner surface 8 toward the outer surface 6 of the covering layer 2. By opaque, we mean a light transmission rate of less than 5%, preferably close to or equal to 0%. This opacity is achieved by the material used to make the opaque area 18 and/or by the thickness of the covering layer 2. As shown in FIGS. 1 and 2, an opaque area 18 may further extend around the backlit areas 16.

The backlit areas 16 may be obtained by forming openings in the opaque area 18, the shape of the openings defining the shape of the backlit areas 16. According to one embodiment, the openings are further filled with a light transmitting material, such as an optical gel or the like. For example, the openings are recessed into the covering layer 2 or the covering layer 2 is made with openings in the opaque area 18.

It is understood that the covering layer 2 may comprise still other layers. According to the embodiment illustrated in FIGS. 1 and 2, the covering layer 2 is formed as a single layer, comprising the backlit area(s) 16 and the opaque area(s) 18, which areas extend from the inner surface 8 to the outer surface 6.

The light source 4 is arranged to illuminate at least one backlit area 16. It is understood, however, that multiple light sources 4 may be used to illuminate a single backlit area 16.

The light source 4 is formed, for example, by a light-emitting diode emitting light in the visible range. When several light sources 4 are used, they are not necessarily identical and may be formed, for example, by light-emitting diodes emitting light of different colors.

The light source 4 is attached to the inner surface 8 of the covering layer 2 opposite the opaque area 18. Thus, each light source 4 does not extend opposite the backlit area 16 that this light source 4 is to illuminate. In other words, a light source 4 is offset on the inner surface 8 in relation to the backlit area 16. More particularly, the distance between a light source 4 and the corresponding backlit area 16 is between 5 mm and 30 mm, the distance being measured along the inner surface 8 of the covering layer 2. More particularly, the distance d is measured from the point of light emission of the light source 4 to the point of the backlit area 16 closest to the light source 4. This range in value of d ensures good quality illumination of the backlit area 16 while limiting the bulkiness of the assembly formed by the light source 4 and the backlit area 16, as will be described in more detail later.

A light guide 22 extends between the light source 4 and the backlit area 16 so that the light emitted by the light source 4 is guided to the backlit area 16 and transmitted to these areas to be visible on the outer surface 6 of the covering layer 2. The light guide 22 is therefore made of a material suitable for light transmission, such as a transparent plastic material like PC or PMMA.

The light guide 22 is, for example, over-molded onto the inner surface 8 of the covering layer 2 and onto each light source 4. In a variant, the light guide 22 is, for example, an insert, a print-deposited part, or an additive manufacturing part, such as a three-dimensional print.

The light guide 22 comprises an outer face 23 extending over at least part of the inner surface 8 of the covering layer 2, in particular at least opposite a backlit area 16 and covers the light source 4 arranged to illuminate in particular said backlit area 16. By covering, it is meant that the light guide 22 encases the light source(s) 4 so that all the light emitted by these light sources 4 is injected into the light guide 22. The light guide 22 guides, for example, the light emitted by the light source 4 toward a plurality of backlit areas 16, i.e., the light injected into the light guide 22 is transmitted to a plurality of backlit areas 16 via the light guide 22.

The light guide 22 is delimited by an inner face 24 opposite the outer face 23 and protruding from the inner surface 8 of the covering layer 2 around the light source 4. According to the embodiment illustrated in FIG. 1, the inner face 24 comprises a plurality of guide surfaces 26 inclined with respect to each other.

According to this same embodiment, the trim element 1 locally has an axis of symmetry A-A' passing through the light source 4, through an opaque area 18 and extending substantially perpendicular to the covering layer 2, in particular substantially perpendicular to the outer surface of the trim element 1. Thus, the backlit areas 16, the opaque area(s) 18 and the light guide 22 are arranged so as to comply with the resulting axial symmetry. In particular, the guide surfaces 26 are symmetrically arranged entirely around the axis of symmetry A-A'.

According to the embodiment shown in FIGS. 1 and 2, the trim element 1 further comprises a support 34 extending at least partially over the inner surface 8 of the trim layer 2 at the periphery of the light guide 22 and covering the light guide 22. In particular, the support 34 is arranged to give rigidity and shape to the trim element 1. In particular, the covering layer 2 conforms to the shape of the outer surface of the support 34. "Covering the light guides 22" means that the light guides 22 extend completely within the support 34 and that the support 34 covers at least part of the inner face 24 of the light guide 22 and in particular the entire inner face 24.

The light guide 22 is, for example, formed by a resin deposited in a cavity formed by the support 34.

According to one embodiment, the inner face 24 of the light guide 22 is additionally covered by a reflecting element 36 arranged to reflect the light rays coming from the light source 4 covered by the light guide 22 and incident on the inner face 24 of the light guide 22. The reflected light rays are more particularly directed toward a backlit area 16.

The reflecting element 36 is formed, for example, by a reflecting layer 37 defining a reflective surface 38, applied to at least part of the inner face 24 of the light guide 22, optionally between the light guide 22 and the support 34, as shown in FIG. 1. Thus, the reflecting layer 37 extends at least partially over the inner face 24 of the light guide 22. In particular, the reflecting layer 37 is applied to the guide surfaces 26 of the light guide 22 so as to form a reflecting surface 28 on each guide surface 26.

Each reflecting surface 28 is, for example, flat or curved.

All of the reflecting surfaces 28 together constitute the reflective surface 38. The reflecting surfaces 28 are inclined with respect to each other and extend between the support 34 and the covering layer 2. They are arranged to guide the light emitted by the light source 4 toward the backlit area 16.

Thus, the reflective surface 38 extends opposite the inner surface 8 of the covering layer 2 and in particular opposite the light source 4 and is arranged to reflect the light emitted by the light source 4 toward the backlit area 16.

In particular, the light is emitted by the light source 4 toward the reflective surface 38 in at least a first direction I opposite to the covering layer 2 and is reflected from the reflective surface 38 toward the backlit area(s) 16 in at least a second direction R extending toward the covering layer 2.

In particular, the reflective surface 38 is directed relative to the inner surface 8 of the covering layer 2 to reflect the light emitted from the light source 4 toward the backlit area 16.

According to the embodiment shown in FIG. 1, the reflective surface 38 comprises a central conical reflecting surface 40 whose apex is directed toward the light source 4 and whose axis is coincident with the axis of symmetry A-A'. According to a variant, the central reflecting surface 40 is frustoconical.

According to this same embodiment, the reflective surface 38 comprises at least one peripheral reflecting surface 41 extending around the central reflecting surface 40 from the central reflecting surface 40 toward the covering layer 2. The peripheral reflecting surface 41 is, for example, formed by a plurality of frustoconical surfaces with their apexes directed toward the support 34. These truncated conical surfaces are arranged so that they have a decreasing cone angle as the distance between them and the covering layer 2 decreases.

According to a variant of this embodiment, the peripheral reflective surface 41 consists of a single parabolic surface opposite the covering layer 2 and whose parabola axis passes through the light source 4.

According to still another variant of this embodiment, the reflecting surface 38 comprises only a conical, truncated cone or parabolic reflecting surface, the apex of which being respectively directed toward the support 34 for the conical and truncated cone reflecting surfaces, and the parabola of which being turned toward the covering layer 2 for the parabolic reflecting surface.

According to the embodiment illustrated in FIG. 1, when a light ray emitted by the light source 4 reaches the central reflecting surface 40 it is reflected, deviated from the axis A-A' and directed toward the peripheral reflecting surface 41. When said light beam reflected by the central reflecting surface 40 reaches the peripheral reflecting surface 41, it is reflected again and directed either toward another peripheral reflecting surface 41 or toward the covering layer 2, in particular toward a backlit area 16 of the covering layer 2.

The light guide 22 is thus arranged to diffuse the light emitted by the light source 4 toward the reflective surface 38 and from the reflective surface 38 toward the backlit area(s) 16.

According to another embodiment, the support 34 is directly made of a reflective material so that the support 34 is also the reflecting element 36 and defines a reflective surface 38. Thus, all light rays emitted by a light source 4 and directed toward the inner side 24 of the light guide 22 in which this light source 4 is placed are reflected and directed by the reflective surface 38 to a backlit area 16 and reach the outer surface 6 of the covering layer 2 by passing through the backlit area 16.

According to one embodiment, a layer of reflecting material is applied to the inner surface 8 of the covering layer 2 around the light source 4 opposite each backlit area 16.

The light guide 22 and the distance travelled by the light emitted by the light source 4 toward the backlit area 16 ensure a good quality display on the outer surface 6 of the covering layer 2. Indeed, thanks to the distance to be traveled by the light from the light source 4 toward the reflective surface 38 and from the reflective surface 38 toward the backlit area 16, it is ensured that the light emitted by the light source 4 is harmonized when it reaches the outer surface 6 of the covering layer 2 through the backlit area 16. This is because the reflections within the light guide 22 enable the path of the light rays between the light source 4 and the outer surface 6 to be extended, thus harmonizing the light.

The trim element 1 can thus remain relatively thin in girth because the light source 4 is arranged against the inner surface 8 of the trim layer 2 while showing satisfactory illumination of the backlit areas 16. Thus, the trim element 1 may have, for example, a minimum thickness of 4 mm, measured from the point of the light guide 22 furthest from the covering layer 2 to the outer surface 6 of the covering layer 2, whereas this thickness is generally around 15 mm in the case of a light source arranged opposite the backlit area by this light source. By providing that the distance between the light source 4 and the corresponding backlit area 16 is less than or equal to 9 mm, it is ensured that the space requirement of a light guide 22 remains limited and enables, in particular, a large number of backlit areas 16 to be adjacent to one another.

The trim element 1 thus enables achieving satisfactorily illuminated backlit areas with harmonious light while limiting the thickness of the trim element 1 so as to reduce its space requirement.

In addition, the trim element 1, due to its arrangement, enables the illumination of large backlit areas with a single light source where other trim elements with a different arrangement would require multiple light sources to achieve illumination of comparably sized backlit areas.

The invention claimed is:

1. A trim element comprising a covering layer having an outer surface that forms an outer surface of the trim element and having an inner surface, opposite the outer surface of the covering layer, the covering layer comprising at least one opaque area preventing the passage of light from the inner surface to the outer surface and at least one backlit area in which said covering layer is translucent so as to allow light to pass from the inner surface to the outer surface, the backlit area extending around at least part of the opaque area, the trim element further comprising at least one light source and at least one reflective surface extending opposite the light source and being arranged to reflect toward the backlit area light emitted by the light source,
wherein the light source is attached to the inner surface of the covering layer against the opaque area, the reflective surface extending opposite the inner surface of the covering layer and being oriented with respect to said inner surface to reflect toward the backlit area the light emitted by the light source.

2. The trim element according to claim 1, further comprising a support, the covering layer extending at least partially over the support,
the reflective surface comprising a plurality of reflecting surfaces inclined with respect to each other and extending between the support and the covering layer and guiding toward the backlit area the light emitted by the light source.

3. The trim element according to claim 1, wherein light is emitted from the light source toward the reflective surface in at least a first direction away from the covering layer and is reflected from the reflective surface toward the backlit area in at least a second direction extending toward the covering layer.

4. The trim element according to claim 1, further comprising a light guide comprising:
an outer face extending over at least part of the inner surface of the covering layer opposite the backlit area and covering the light source, and
an inner face extending over at least part of the reflective surface,
the light guide being arranged to diffuse light emitted by the light source toward the reflective surface and from the reflective surface toward the backlit area.

5. The trim element according to claim 4, wherein the light guide is over-molded onto the inner surface of the covering layer and onto each light source.

6. The trim element according to claim 4, wherein the reflective surface is defined by a reflecting layer extending at least partially over the inner face of the light guide.

7. The trim element according to claim 1, wherein at least one backlit area extends entirely around the opaque area,
the reflective surface having an axis of symmetry passing through the light source and extending substantially perpendicular to the outer surface of the trim element,
the reflective surface reflecting the light emitted by said light source toward said backlit area, the light being distributed over the entire backlit area.

8. The trim element according to claim 1, further comprising a printed circuit on the inner surface of the covering layer, the printed circuit electrically connecting each light source to an electric power source.

9. The trim element according to claim 8, further comprising a switch and a touch film,
the switch electrically connecting the light source and the electric power source and being movable between a closed position in which the electric power source powers the light source and an open position in which the electric power source does not power the light source,
the touch film extending over the inner surface of the covering layer opposite the opaque area and being configured to change the switch between its closed position and its open position when pressure is applied to said touch film.

10. The trim element according to claim 1, further comprising a functional element extending on the outer surface of the covering layer opposite the opaque area.

* * * * *